United States Patent
Spietschka et al.

[11] 3,865,605
[45] Feb. 11, 1975

[54] READILY DISPERSIBLE PIGMENTS

[75] Inventors: Ernst Spietschka, Oberauroff; Manfred Urban, Delkenheim, both of Germany

[73] Assignee: Farbwerke Hoechst Aktiengesellschaft Vormals Meister Lucius & Bruning, Frankfurt/Main, Germany

[22] Filed: Oct. 19, 1972

[21] Appl. No.: 299,132

[30] Foreign Application Priority Data
Oct. 21, 1971  Germany............................ 2152485

[52] U.S. Cl............................ 106/288 Q, 106/308 S
[51] Int. Cl............................................ C08h 17/14
[58] Field of Search..................... 106/308 S, 288 Q

[56] References Cited
UNITED STATES PATENTS

| | | | |
|---|---|---|---|
| 2,987,412 | 6/1961 | Csonka et al. | 106/309 |
| 3,067,053 | 12/1962 | Tarantino | 106/308 S |
| 3,252,809 | 5/1966 | Somers | 106/308 S |

FOREIGN PATENTS OR APPLICATIONS

| | | | |
|---|---|---|---|
| 246,507 | 6/1927 | Great Britain | 106/308 S |

Primary Examiner—Delbert E. Gantz
Assistant Examiner—I. V. Howard
Attorney, Agent, or Firm—Curtis, Morris & Safford

[57] ABSTRACT

Readily dispersible pigments containing 1 to 10 per cent of a surface-active agent of the formulae

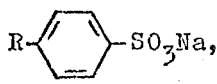

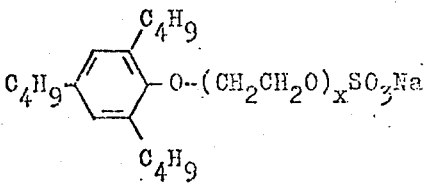

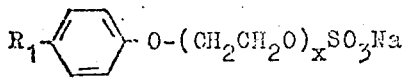

wherein R is alkyl with 10 to 14 carbon atoms, $R_1$ is alkyl with 9 to 12 carbon atoms and $x$ is an integer of from 3 to 8, and process for their preparation.

These pigments show a substantially improved dispersibility in the usual lacquer bases.

5 Claims, No Drawings

READILY DISPERSIBLE PIGMENTS

The present invention relates to pigments having an improved dispersibility and to a process for preparing them.

A substantial requirement to be fulfilled by pigments used for lacquers and varnishes is the ease of being dispersed in the lacquer or varnish upon grinding. As it is known, however, this requirement is the more difficult to be met the more glazing the pigment is, i.e., the smaller its particle size is. In the case of quinacridones which, to their major part, are used for the cross-dyeing of inorganic pigments or for the metallic effect lacquers, a high degree of glazing is absolutely necessary, and there is a real demand for these products to be obtained in a readily dispersible form.

In order to achieve this, it is possible according to the disclosure of German Pat. (DOS) No. 1 619 620 to treat part of the pigment with sulfonic acid and to convert the free sulfonic acid group subsequently into a sparingly soluble metal salt, for example the aluminium salt. This method is, however, expensive since an additional process step and an additional drying operation are required. The process known from British Pat. No. 1 087 004 is also expensive. In this process, the quinacridone is first ground after drying and then stirred in a second process step for some time with an organic solvent, optionally with the addition of an emulsifier. The product obtained is generally worked up by removing the organic solvent by steam distillation.

It has now been found that pigment, especially quinacridone pigments, having an improved dispersibility, can be obtained in a simple manner by stirring the pigment with an alkaline solution of an alkyl-aryl-sulfonate of the general formula

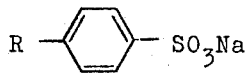

in which R stands for straight-chain or branched alkyl having 10 to 14, preferably 12, carbon atoms, or of an alkyl-phenol polyglycol ether sulfonate of the general formulae

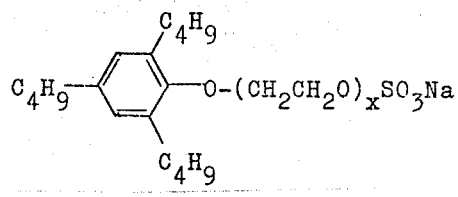 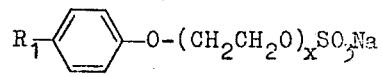   or in which $R_1$ stands for straight-chain or branched alkyl having 9 to 12 carbon atoms and $x$ for an integer of from 3 to 8, preferably from 7 to 8, at an elevated temperature, acidifying the mixture subsequently and isolating the pigment in usual manner.

The treatment is carried out by stirring the aqueous moist filter cake, for example of quinacridone pigments as obtained according to German Pat. Nos. 1 184 881, 1 150 046 and 1 261 106, with 10 to 20 times its amount of water, calculated on the dry dyestuff, adding an alkaline solution of an alkyl-aryl-sulfonate or alkyl-phenol polyglycol ether sulfate and stirring the whole at a temperature of from 50° to 100°C for 1 to 5 hours. The mixture is then acidified by adding a mineral acid, it is optionally stirred for a short time and the pigment is isolated in usual manner by filtering and drying. The alkyl-aryl-sulfonate or alkyl-phenol polyglycol ether sulfate is added in an amount of from 1 to 10 percent, preferably of 5 percent, calculated on the dry pigment, after having been dissolved in a sufficient amount of alkaline agent. A preferred embodiment of the invention consists in performing the treatment subsequent to the solvent finish after the separation of the solvent by distillation and without intermediate isolation of the quinacridone.

As compared to the unprepared pigments, the quinacridone pigments thus treated show a substantially improved dispersibility in the usual lacquer bases. It was surprising to achieve such an effect by merely stirring them with surface-active compounds, since it was only known from British Pat. No. 1 087 004 that the use of surface-active substances was intended for emulsifying the organic solvent.

The following Examples serve to illustrate the invention, the parts and percentages being by weight unless stated otherwise.

EXAMPLE 1

500 Parts of water were added to a suspension of 40 parts of unsubstituted linear quinacridone of the β-phase (100 %), 225 parts of water, 225 parts of ethanol and 2.25 parts of NaOH, as obtained according to German Pat. No. 1 150 046, the alcohol was distilled off until the temperature of the distillate that passed over had reached 100°C. Subsequently, a solution of 4 parts of the compound of the formula

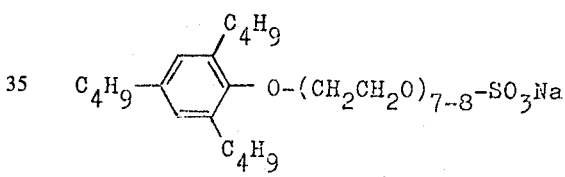

in NaOH (pH 9) was added at 90°C and the mixture was stirred for 2 hours at this temperature. The solution was then acidified with dilute hydrochloric acid likewise at 90°C and stirring was continued for 15 minutes. The product was suction-filtered, the residue was washed until neutral and dried in a circulating air cabinet. The prepared pigment obtained has a substantially better dispersibility than an unprepared pigment.

EXAMPLE 2

180 Parts of an aqueous filter cake (corresponding to 40 parts of a 100 percent pigment) of unsubstituted linear quinacridone of the γ-phase as prepared according to German Pat. No. 1 184 881, were stirred in 500 parts of water, and the mixture was heated to 50° – 60°C. At this temperature, a solution of 2 parts of sodium p-dodecyl-phenyl-sulfonate in NaOH (pH 9) was added. The mixture was stirred for 2 hours, acidified with dilute sulfuric acid, and stirring was continued for 15 minutes at 50° – 60°C. The pigment was suction-filtered, washed to neutral and dried in a circulating air cabinet. It has an excellent dispersibility.

In the same manner, 180 parts of an aqueous filter cake of unsubstituted linear quinacridone of the β-phase could be treated with 4 parts of the surfactant of Example 1. The pigment thus obtained has a substantially better dispersibility than the unprepared pigment.

EXAMPLE 3

180 Parts of an aqueous filter cake of linear 2,9-dimethyl-3,10-dichloro-quinacridone, as prepared according to German Pat. No. 1 261 106, corresponding to 40 parts of a 100 percent pigment, were stirred in 500 parts of water and the mixture was heated to 70° – 80°C. At the same temperature, a solution of sodium p-dodecyl-phenyl-sulfonate in NaOH (pH 9) was added and stirring was continued for 2 hours. The mixture was then acidified with dilute sulfuric acid and stirring was continued for 15 minutes at 70° – 80°C. The pigment thus treated was suction-filtered, washed to neutral and dried in a circulating air cabinet. The pigment has an excellent dispersibility.

We claim:

1. A readily dispersible quinacridone pigment composition consisting essentially of finely divided quinacridone pigment containing 1 to 10 percent by weight, based on dry weight of pigment of at least one of a surface-active agent of the formulae

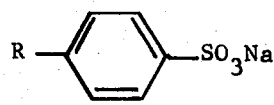

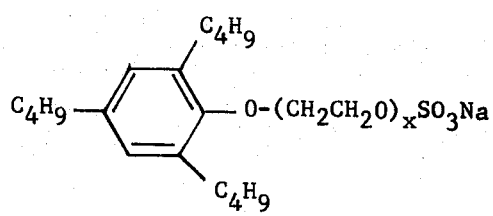

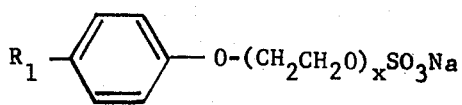

wherein R is alkyl with 10 to 14 carbon atoms, $R_1$ is alkyl with 9 to 12 carbon atoms and $x$ is an integer of from 3 to 8.

2. The pigment composition of claim 1 dispersed in a lacquer or varnish.

3. A readily dispersible pigment composition consisting essentially of finely divided quinacridone pigment containing 1 to 10 percent by weight, based on dry weight of pigment of at least one of a surface-active agent of the formulae

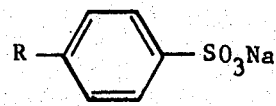

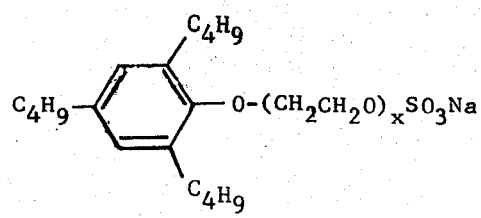

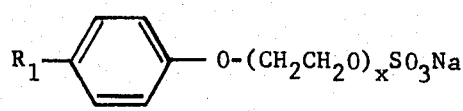

wherein R is alkyl with 10 to 14 carbon atoms, $R_1$ is alkyl with 9 to 12 carbon atoms and $x$ an integer of from 3 to 8; and a lacquer or varnish, said pigment being dispersed in said lacquer or varnish.

4. A process for preparing a readily dispersible finely divided quinacridone pigment composition consisting essentially of mixing a finely divided quinacridone pigment with an amount of water 10 to 20 times the weight of said pigment, and with 1 to 10 percent by weight, based on dry weight of pigment of at least one of a surface-active agent of the formulae

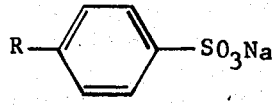

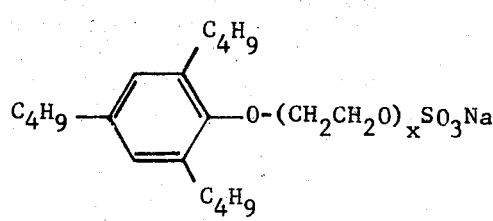

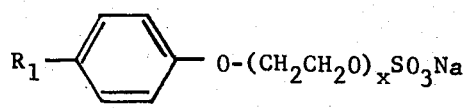

wherein R is alkyl with 10 to 14 carbon atoms, $R_1$ is alkyl with 9 to 12 carbon atoms and $x$ an integer of from 3 to 8, stirring the mixture at a temperature of 50° to 100°C for 1 to 5 hours and acidifying the mixture.

5. The process of claim 4 wherein the pigment composition is separated from the reaction mixture and is added to a lacquer or varnish.

* * * * *